United States Patent [19]
Stromblad et al.

[11] 3,804,362
[45] Apr. 16, 1974

[54] MOULDING MEANS

[75] Inventors: John Stromblad, Vasteras; Gunnar Johansson, Mora, both of Sweden

[73] Assignee: Allmanna Svenska Elektriska Aktiebolaget, Vasteras, Sweden

[22] Filed: Dec. 26, 1972

[21] Appl. No.: 318,119

Related U.S. Application Data
[63] Continuation of Ser. No. 75,356, Sept. 25, 1970, abandoned.

[30] Foreign Application Priority Data
Oct. 1, 1969    Sweden.................... 13542/69

[52] U.S. Cl................ 249/78, 425/DIG. 13
[51] Int. Cl.............................. B29c 1/00
[58] Field of Search........... 425/DIG. 13, 143, 144, 425/407, 384, 243; 249/78; 136/203, 204

[56]       References Cited
       UNITED STATES PATENTS
3,075,360  1/1963  Elfuing et al................. 249/78 X
3,234,595  2/1966  Weichselbaum et al..... 425/DIG. 13
3,319,289  5/1967  McCormick................. 425/466 X
3,314,242  4/1967  Lefferts......................... 136/204 X

OTHER PUBLICATIONS

William R. Stubstad, "Temperature Control With Thermoelectrics," Power Control, Sept., 1961, pp. 178 & 179.

Primary Examiner—J. Spencer Overholser
Assistant Examiner—David S. Safran
Attorney, Agent, or Firm—Kenyon & Kenyon Reilly Carr & Chapin

[57]       ABSTRACT

A plastic mould apparatus having Peltier elements for heating plastic in the mould or cooling the same depending on the current direction in the Peltier elements.

1 Claim, 1 Drawing Figure

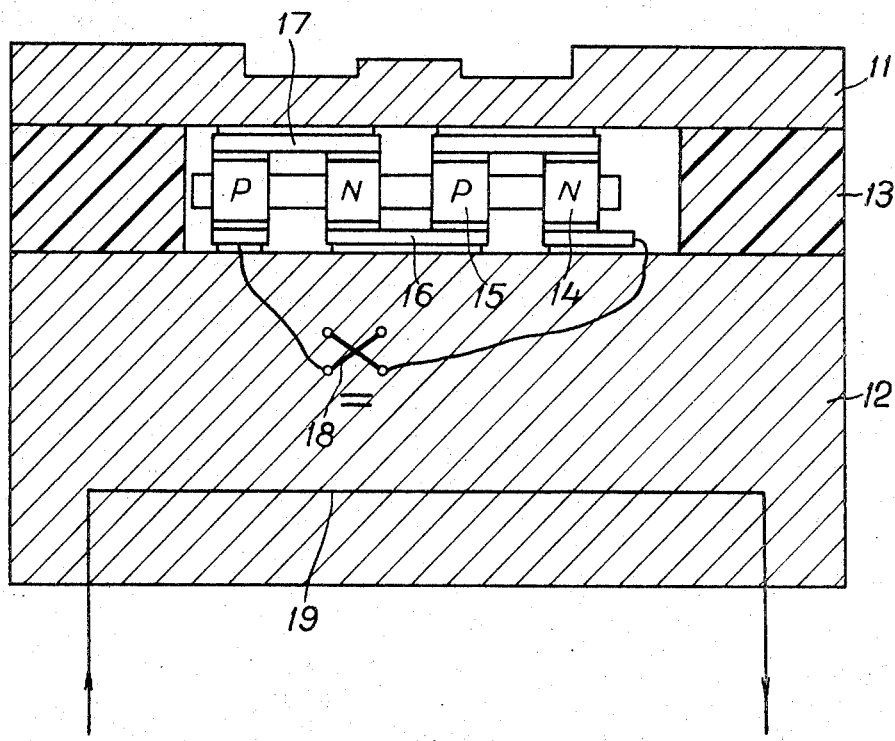

MOULDING MEANS

This application is a continuation of application Ser. No. 75,356 filed Sept. 25, 1970 by John Stromblad and Gunnar Johansson for Moulding Means which is now abandoned.

The present invention relates to a casting means, particularly for material having low melting point, such as plastics, comprising a casting mould.

When casting or injection-moulding plastics, plastic-curing or pressing, i.e., shaping at a temperature of up to a couple of hundred degrees centigrade, it is desirable for the mould to be warm when the material is poured in, in order to fill it out well. However, rapid cooling of the mould is also desired after filling and one problem with this is the relatively complicated heating and cooling means required and the poor result. The conditions are similar to those occurring when casting metals or metal alloys at high temperatures.

The present invention relates to a solution of these and other similar problems and is characterised in that at least a part of the casting mould is divided into two thermally insulated sections, one being a part of the actual mould portion having a moulding space, and that between the sections so-called Peltier elements are arranged, with the heat-emitting and heat-absorbing parts, respectively, in contact with each section, and that the current direction through the elements is reversible in order to change from cooling to heating, or vice versa, of the moulding space section. Such a device makes it possible rapidly to raise or lower the temperature in the mould and thus achieve rapid production with high quality.

The Peltier element may consist of semiconductors of bismuth telluride of alternately P and N type connected in series and/or parallel. Such semiconductors are normally used in temperatures of up to 230°C, while semiconductors of lead or zinc telluride are used in temperatures of up to 530°C and over this temperature semiconductors of silicon-germanium type are used. The choice of semiconductor type is thus dependent on at what temperature the casting or injection moulding is to take place. In certain cases it is even possible to use elements of iron-constantan or the like.

In the accompanying drawing, the single FIGURE schematically shows in vertical section one example of the invention.

The invention is exemplified in the accompanying drawing which shows the lower part 11 of a mould for injection-moulding or curing plastic. This part or section 11 is part of the mould in a casting means for plastic, together with a second section 12, considerably larger than the first section 11. The sections 11 and 12 are substantially thermally insulated from each other, for example separated by thermally insulating blocks or plates 13 and between the sections are arranged Peltier elements, for example semiconductor elements of alternately P and N type (14, 15) connected in series and/or parallel. The semiconductor elements are electrically connected to each other by means of metal conductors 16, 17, these also being a part of the heat-emitting and heat-absorbing parts of the Peltier element, and in direct heat-conducting contact with these bridges are also arranged the two sections 11, 12, forming the mould. When direct current having a certain direction flows through the elements the bridge 17 and thus the section 11 become warm while the bridge 16 and section 12 will be cooled, or vice versa. Due to the size of the section 12 the temperature alteration in this will be small, while the alteration in section 11 will be greater. The heating or cooling effect can be alternated by reversing the current direction (see 18). A certain basic heating or cooling can be obtained in conventional manner, for example by means of a water or oil pipe 19 in the larger section 12. This pipe 19 with its control means may also be used to stabilize the temperature in the section 12. Peltier elements may also be arranged in the upper part of the mould (not shown).

The device is used in the following way:

Current of a certain direction is fed through the semiconductor elements 14, 15, whereupon section 11 is heated and section 12 cooled, the latter, due to the size of this section and any influence from the pipe 19, being negligible. A certain basic warmth has already previously been effected in the mould by the pipe 19 or some other way, so that only a certain addition temperature increase takes place in the mould due to the Peltier effect. Liquid plastic is injected into the mould and rapidly fills the spaces and is cured. The current is then reversed (at 18) and the section 11 is cooled so that the plastic solidifies. The section 12 is heated, but only negligibly for the reasons given above. The moulded body is then removed and the heating can be renewed, after which a new body can be cast.

Means of this type can be used for various types of moulding or casting and the type of Peltier element can be selected according to the above. Possibly the permanent heating member 19 may be omitted, but in this case a certain temperature variation in the section 12 must be accepted. One or both the sections may be heated even more than by the Peltier effect in generally known ways, for example by inductive heating, radiation heating, etc. The number of Pelletier semiconductor elements may be chosen according to the requirements and the size or the equipment and even the current fed to the Peltier elements may be controlled to obtain temperature control in the mould.

The means can be varied in many ways within the scope of the following claims.

We claim:

1. A mold for rapidly molding material where the material initially requires a warm mold and the mold to be thereafter rapidly cooled for rapid hardening of the material, said mold comprising:
   an upper mold section formed to define a space in which the material is to be so molded:
   a lower mold section having a size substantially greater than the size of the upper mold section,
   Peltier elements between the upper and lower mold sections having cooling-heating elements in heat conducting contact with the mold sections so arranged that the upper mold section may be heated or cooled by the element in contact therewith dependent on the direction of current through the Peltier elements while in reversed order cooling or heating the lower mold section by the element in contact therewith and thermal insulating means separating the upper and lower mold sections, said lower section being of sufficient size so that by the action of the Peltier elements its temperature is negligibly affected relative to the heated or cooled temperatures of said upper section effected by the action of said Peltier elements.

* * * * *